(12) United States Patent
Lai et al.

(10) Patent No.: US 7,601,444 B2
(45) Date of Patent: Oct. 13, 2009

(54) PERPENDICULAR MAGNETIC RECORDING MEDIUM

(75) Inventors: Chih-Huang Lai, Hsinchu (TW); David Vokoun, Hsinchu (TW); Yu-Yi Liao, Hsinchu (TW); Meng-Shian Lin, Hsinchu (TW)

(73) Assignee: National Taiwan University, Taipei (TW)

( * ) Notice: Subject to any disclaimer, the term of this patent is extended or adjusted under 35 U.S.C. 154(b) by 123 days.

(21) Appl. No.: 11/590,641

(22) Filed: Oct. 30, 2006

(65) Prior Publication Data

US 2007/0247756 A1 Oct. 25, 2007

(30) Foreign Application Priority Data

Apr. 21, 2006 (TW) ............... 95114274 A

(51) Int. Cl.
G11B 5/66 (2006.01)
(52) U.S. Cl. .............. 428/831.2; 428/826; 428/828; 428/831
(58) Field of Classification Search ............... None
See application file for complete search history.

(56) References Cited

U.S. PATENT DOCUMENTS 6,816,347 B2 * 11/2004 Koi et al. ............ 360/324.11
7,235,314 B2 * 6/2007 Chen et al. ............ 428/831

OTHER PUBLICATIONS

Vokoun et al Journal of Applied Physics 99, 1-2006 Effects of Tb/Pt/Ru underlayer on microstructure and magnetic properties of CoPtCr-SiO2 perpendicular media.*
Vokoun, et al., "Effects of Tb/Pt/Ru underlayer on microstructure and magnetic properties of CoPtCr-SiO2 perpendicular media," Journal of Applied Physics 99, 1 (2006), American Institute of Physics, pp. 1-1, 1-2, 1-3, and 1-4.

* cited by examiner

Primary Examiner—Kevin M. Bernatz
Assistant Examiner—Gary Harris
(74) Attorney, Agent, or Firm—Christie, Parker & Hale, LLP.

(57) ABSTRACT

A perpendicular magnetic recording medium includes: a substrate; a soft magnetic film formed on the substrate; a non-magnetic film including an amorphous interlayer formed on the soft magnetic film and made from a metallic material selected from terbium, gadolinium, dysprosium, tantalum, hafnium, and combinations thereof, a buffer layer formed on the amorphous interlayer and having a face-centered cubic structure, and a seed layer formed on the buffer layer and having a hexagonal crystal structure; and a granular magnetic recording film formed on the seed layer.

8 Claims, 4 Drawing Sheets

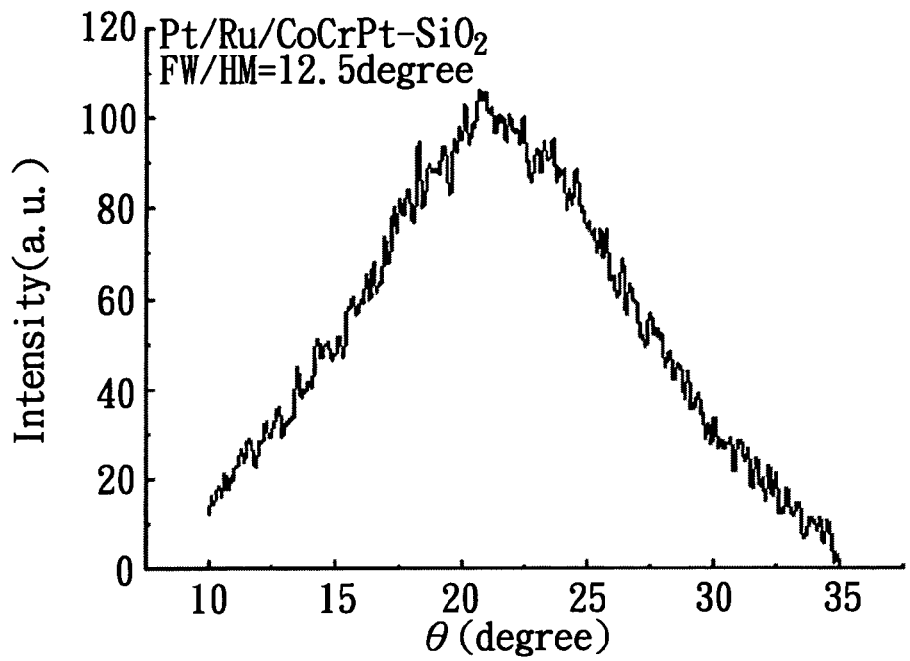
F I G. 3
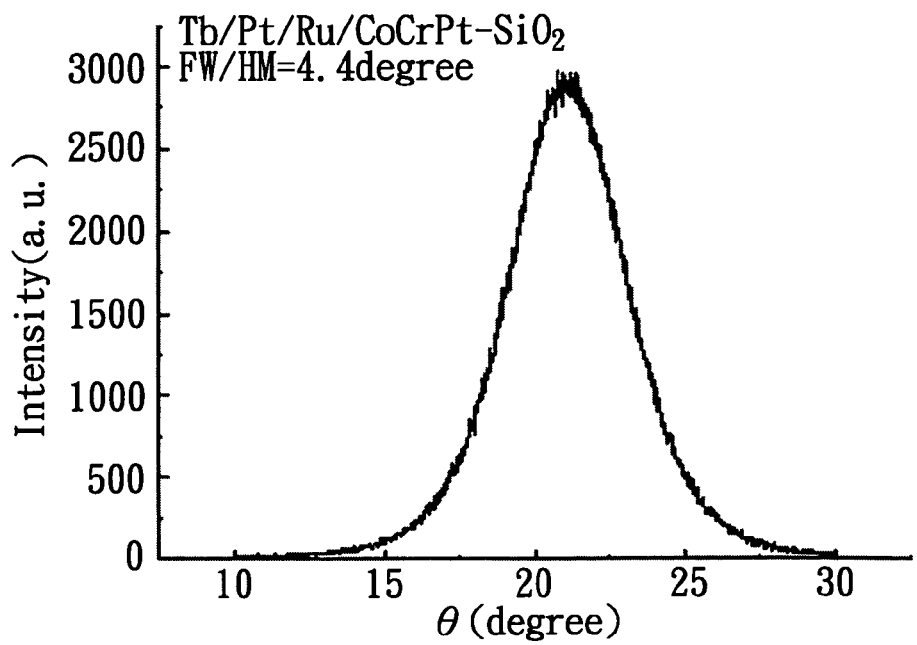
F I G. 4

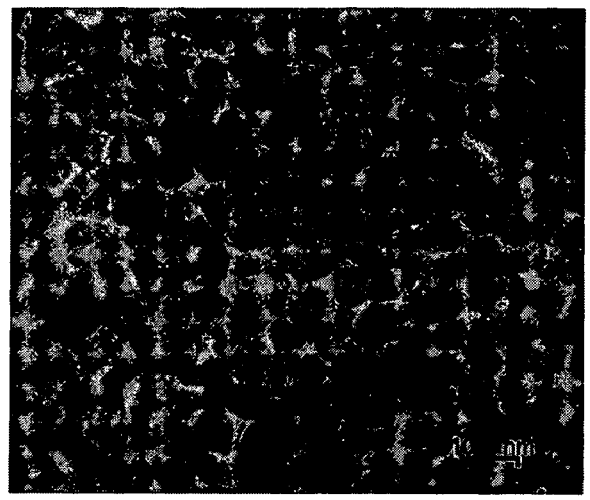
F I G. 5
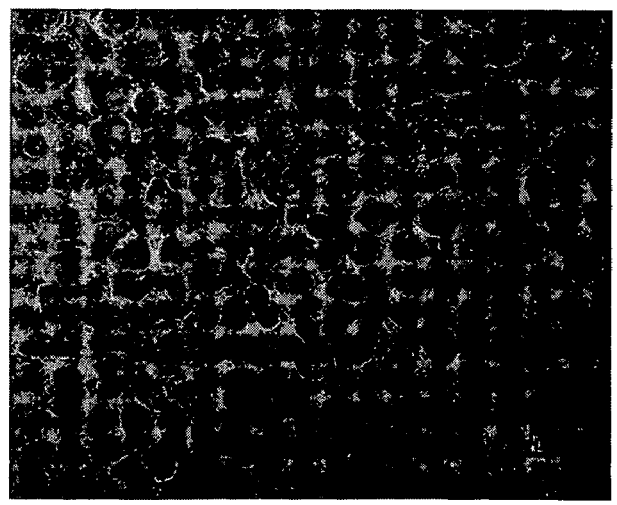
F I G. 6

PERPENDICULAR MAGNETIC RECORDING MEDIUM

CROSS-REFERENCE TO RELATED APPLICATION

This application claims priority of Taiwanese application no. 095114274, filed on Apr. 21, 2006.

BACKGROUND OF THE INVENTION

1. Field of the Invention

This invention relates to a recording medium, more particularly to a perpendicular magnetic recording medium.

2. Description of the Related Art

As technology advances, higher recording density of a recording medium is required. To increase the recording density, minimization of the volume of each of recording units of the recording medium has been proposed. However, when the recording unit gets smaller, the product (KuV) of the perpendicular anisotropy constant (Ku) and the switching volume (V) of the recording unit will become insufficient to overcome thermal disturbance caused by exterior temperature, thereby resulting in superparamagnetism attributed to unstable magnetic moment.

To solve the superparamagnetism problem, a perpendicular magnetic recording medium has been proposed. In the perpendicular magnetic recording medium, since the magnetic moment is perpendicular to a magnetic recording layer, thermal stability can be maintained even though the volume of the recording unit is reduced.

FIG. 1 shows a conventional perpendicular magnetic recording medium 1 including a substrate 11, a soft magnetic film 14 formed on the substrate 11, a non-magnetic film 13 formed on the soft magnetic film 14, and a magnetic recording film 12 formed on the non-magnetic film 13. The non-magnetic film 13 includes an interlayer 131, a buffer layer 132, and a seed layer 133 formed on the soft magnetic film 14 from bottom to top in this sequence.

In general, in order to minimize the volume of a recording unit, the magnetic recording film 12 made from a granular Co-based material, such as CoPtCr—SiO$_2$, issued. In CoPtCr—SiO$_2$, SiO$_2$ is segregated at CoPt grain boundaries, Pt enhances perpendicular anisotropy constant (Ku) of the magnetic recording film 12, and Cr is used to reduce undesired recording medium noise. Therefore, the size of the CoPt grain can be minimized and signal interference among the grains can be reduced, which results in an increase in signal to noise ratio (SNR) of the magnetic recording film 12. In addition, since Co element has an easy axis parallel to a c-axis of the lattice, in order to permit CoPt grains in the magnetic recording film 12 to grow in a fixed orientation texture, i.e., (0002) texture, along a direction (X) shown in FIG. 1 so as to improve the perpendicular anisotropy constant, the seed layer 133 is usually made from a material having a hexagonal close packed (hcp) crystal structure.

In addition, since (111) plane of face centered cubic (fcc) crystal structure exhibits the best lattice match with (0002) plane, the buffer layer 132 made from a non-magnetic material with a fcc structure is provided beneath the seed layer 133 so as to control the crystal growth orientation of the seed layer 133 and the magnetic recording film 12 along (0002) plane.

Theoretically, grain orientation of the magnetic recording film 12, the seed layer 133, and the buffer layer 132 is mainly controlled by interfacial strain and tensile stress. Specifically, reduced interfacial strain achieved by providing good lattice match at the interface of two films/layers and higher tensile stress favor growth of (0002) orientation texture. To improve desired orientation texture of these film/layers and thus the perpendicular anisotropy constant, the interlayer 131 is provided. In present use, amorphous nickel-phosphorus alloy or cobalt-zirconium alloy is used as a material for the interlayer 131. However, improvement of the desired orientation texture to the magnetic recording film 12, the seed layer 133, and the buffer layer 132 provided by such interlayer 131 is limited. Hence, there is a need in the art to provide a perpendicular magnetic recording medium having an interlayer that can improve the growth of (0002) orientation texture and thus enhance the perpendicular anisotropy constant as compared to the prior art.

SUMMARY OF THE INVENTION

According to this invention, a perpendicular magnetic recording medium includes: a substrate; a soft magnetic film formed on the substrate; a non-magnetic film having an amorphous interlayer formed on the soft magnetic film and made from a metallic material selected from the group consisting of terbium, gadolinium, dysprosium, tantalum, hafnium, and combinations thereof, a buffer layer formed on the amorphous interlayer and having a face-centered cubic structure, and a seed layer formed on the buffer layer and having a hexagonal crystal structure; and a granular magnetic recording film formed on the seed layer.

BRIEF DESCRIPTION OF THE DRAWINGS

Other features and advantages of the present invention will become apparent in the following detailed description of the preferred embodiment of this invention, with reference to the accompanying drawings, in which:

FIG. 3 is a graph illustrating a rocking curve of the comparative example of a perpendicular magnetic recording medium without an interlayer;

FIG. 4 is a graph illustrating a rocking curve of the perpendicular magnetic recording medium shown in FIG. 2, in which the interlayer is made from Tb;

FIG. 5 is a TEM photograph illustrating grain morphology of the granular magnetic recording film of the comparative example of the perpendicular magnetic recording medium;

FIG. 6 is a TEM photograph illustrating grain morphology of the granular magnetic recording film of the perpendicular magnetic recording medium shown in FIG. 2, in which the interlayer is made from Tb;

DETAILED DESCRIPTION OF THE PREFERRED EMBODIMENT

Figure 1:
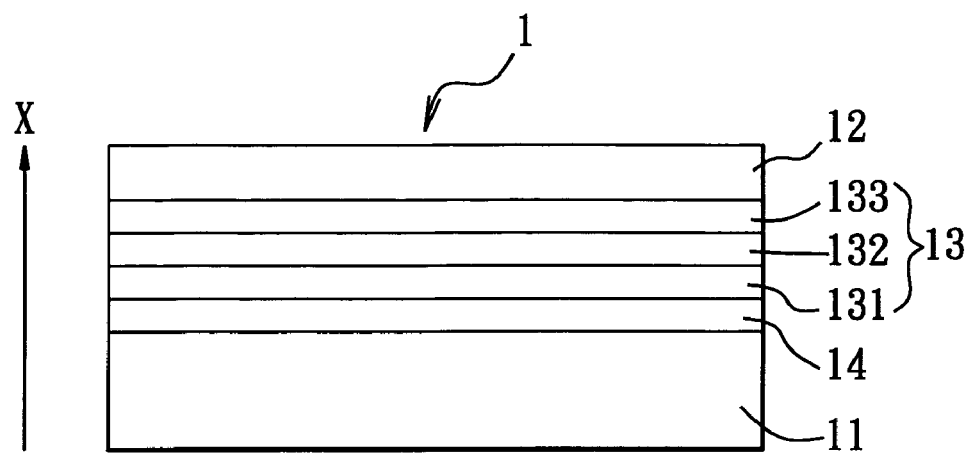
FIG. 1 is a schematic view of a conventional perpendicular magnetic recording medium.
Figure 2:
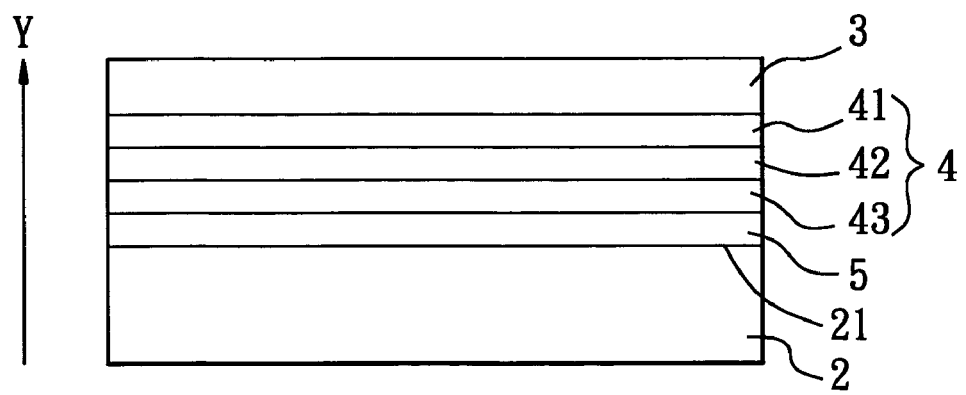
FIG. 2 is a schematic view of the preferred embodiment of a perpendicular magnetic recording medium according to this invention.

Referring to FIG. 2, the preferred embodiment of a perpendicular magnetic recording medium according to the present invention is shown to include a substrate 2; a soft magnetic film 5 formed on the substrate 2; a non-magnetic film 4 including an amorphous interlayer 43 formed on the soft magnetic film 5 and made from a first metallic material selected from the group consisting of terbium (Tb), gadolinium (Gd), dysprosium (Dy), tantalum (Ta), hafnium (Hf), and combinations thereof, a buffer layer 42 formed on the amorphous interlayer 43 and having a face-centered cubic (fcc) structure, and a seed layer 41 formed on the buffer layer 42 and having a hexagonal crystal structure; and a granular magnetic recording film 3 formed on the seed layer 41.

Since the interlayer 43 is amorphous, the issue of lattice match is not to be considered. Moreover, amorphous Tb, Gd, Dy, Ta, or Hf is formed into a plurality of individual island-like nucleate during coalescence so that a relatively large tensile stress is achieved so as to help orientation texture of the buffer layer 42, the seed layer 41 and the granular magnetic recording film 3. In one preferred embodiment of this invention, the amorphous interlayer is made from terbium (Tb).

The seed layer 41 is made from a second metallic material selected from the group consisting of ruthenium (Ru), titanium (Ti), rhenium (Re), osmium (Os), chromium (Cr), zinc (Zn), zirconium (Zr), technetium (Tc), magnesium (Mg), rhodium (Rh), tungsten (W), and combinations thereof.

The buffer layer 42 is made from a third metallic material selected from the group consisting of platinum (Pt), palladium (Pd), copper (Cu), gold (Au), silver (Ag), and combinations thereof.

The granular magnetic recording film 3 is made from a cobalt-based material.

The soft magnetic film 5 is used to provide a closed loop of a magnetic flux and to enhance magnetic efficiency of a writing head. Preferably, the soft magnetic film 5 is made from an alloy selected from the group consisting of cobalt-zirconium-tantalum (CoZrTa), cobalt-zirconium-niobium (CoZrNb), cobalt-iron (CoFe), cobalt-iron-nitrogen (CoFeN), cobalt-iron-boron (CoFeB), iron-tantalum-carbon (FeTaC), iron-aluminum-silicon (FeAlSi), nickel-iron (NiFe), and nickel-phosphorus (NiP). Since it does not affect the analytic experiments done in this invention, the soft magnetic film 5 is not formed in the preferred embodiment of a perpendicular magnetic recording medium according to this invention.

It should be noted herein that the seed layer 41 having a thickness sufficient to provide desired surface roughness can improve the isolation degree of the granular magnetic recording film 3, thereby resulting in a decrease in noise interference attributed to coupling interaction among the grains. However, when the thickness of the seed layer 41 is too large, magnetic flux will be undesirably decreased due to the increased distance between the writing head and the soft magnetic film 5. Preferably, the seed layer 41 has a thickness ranging from 5 nm to 40 nm.

When the thickness of the amorphous interlayer 43 is greater than a thickness of nucleation and growth, the structure of the amorphous interlayer 43 will change into polycrystalline, and an undesired interfacial strain will be formed at an interface between the polycrystalline interlayer 43 and the buffer layer 42. When the thickness of the amorphous interlayer 43 is smaller than the thickness of nucleation and growth, tensile stress provided by the amorphous Tb interlayer 43 is considerably reduced. Preferably, the amorphous interlayer 43 has a thickness ranging from 2 nm to 12 nm.

EXAMPLES

Referring back to FIG. 2, an example of the preferred embodiment of a perpendicular magnetic recording medium according to this invention includes a substrate 2 made from silicon, a granular magnetic recording film 3 having a thickness of 25 nm and made from CoPtCr—SiO$_2$, a seed layer 41 made from Ru with a hcp structure and having a thickness of 20 nm, a buffer layer 42 having a thickness of 7 nm and made from Pt with a fcc structure, an interlayer 43 having a thickness of 3 nm and made from amorphous Tb, and a soft magnetic film 5 having a thickness ranging from 200 nm to 400 nm and made from CoZrTa alloy. In other words, the structure of the perpendicular magnetic recording medium can be represented by Si/CoZrTa/Tb/Pt/Ru/CoPtCr—SiO$_2$ from bottom to top along a direction (Y).

Preparation of the aforesaid perpendicular magnetic recording medium of this invention is described below.

A Si wafer was cleaned and placed in a DC magnetron sputtering system so as to form the soft magnetic film 5 made from CoZrTa alloy. The Tb interlayer 43 was deposited on the soft magnetic film 5 under a working pressure of 3 mTorr. Subsequently, the Pt buffer layer 42 and the Ru seed layer 41 were deposited under a working pressure of 7 mTorr and 20 mTorr, respectively. It should be noted that inappropriate working pressure tends to form poor orientation texture of the granular magnetic recording film 3. Therefore, the working pressure suitable for forming the seed layer 41 was controlled to be within a range from 3 mTorr to 35 mTorr, and more preferably from 20 mTorr to 35 mTorr such that an efficient amount of SiO$_2$ was segregated at grains boundaries so as to minimize the grain size, to reduce noise, and to increase perpendicular coercivity (Hc$_\perp$). Finally, the granular magnetic recording film 3 made from CoPtCr—SiO$_2$ material ($[(Co_{90}Cr_{10})_{100-X}Pt_X]_{100-Y}(SiO_2)_Y$, X=15-30, Y=5-15, available from Heraeus Materials Technology, Taiwan) was deposited on the seed layer 41 under a working pressure of 25 mTorr.

A series of analytic experiments were carried out for the perpendicular magnetic recording medium thus formed and a comparative example of a perpendicular magnetic recording medium. The comparative example of the perpendicular magnetic recording medium has a structure similar to that of the perpendicular magnetic recording medium of the example of this invention, except that an interlayer is not formed in the comparative example.

FIG. 3 is an X-ray diffraction rocking curve for the comparative example of the perpendicular magnetic recording medium without a Tb interlayer, and FIG. 4 is an X-ray diffraction rocking curve for the preferred embodiment of this invention. As shown in FIGS. 3 and 4, the granular magnetic recording film of the comparative example has a $\Delta\theta_{50}$ (i.e., the full width at half maximum (FWHM) of the rocking curve) of 12.5°, and the granular magnetic recording film 3 of the perpendicular magnetic recording medium of this invention has a $\Delta\theta_{50}$ of 4.4°. Since a smaller $\Delta\theta_{50}$ value means a better orientation texture of (0002) plane, the perpendicular magnetic recording medium of this invention has superior (0002) texture over the comparative example.

FIGS. 5 and 6 show TEM photographs of grain morphology of the granular magnetic recording film for the comparative example of the perpendicular magnetic recording medium and the granular magnetic recording film 3 of the preferred embodiment of the perpendicular magnetic recording medium according to this invention. As shown in FIG. 5, the average grain size of the granular magnetic recording film for the comparative example is about 10 nm, and the amount of the SiO$_2$ segregated at grain boundaries is relatively small. As a consequence, noise caused by coupling interaction among the grains is increased. Referring to FIG. 6, the average grain size of the granular magnetic recording film 3 of the perpendicular magnetic recording medium of this invention is smaller than 10 nm. In addition, a sufficient amount of $SiO_2$ is segregated at grain boundaries, so that superior isolation among the grains is achieved and so that noise among the grains is reduced.

Figure 7:
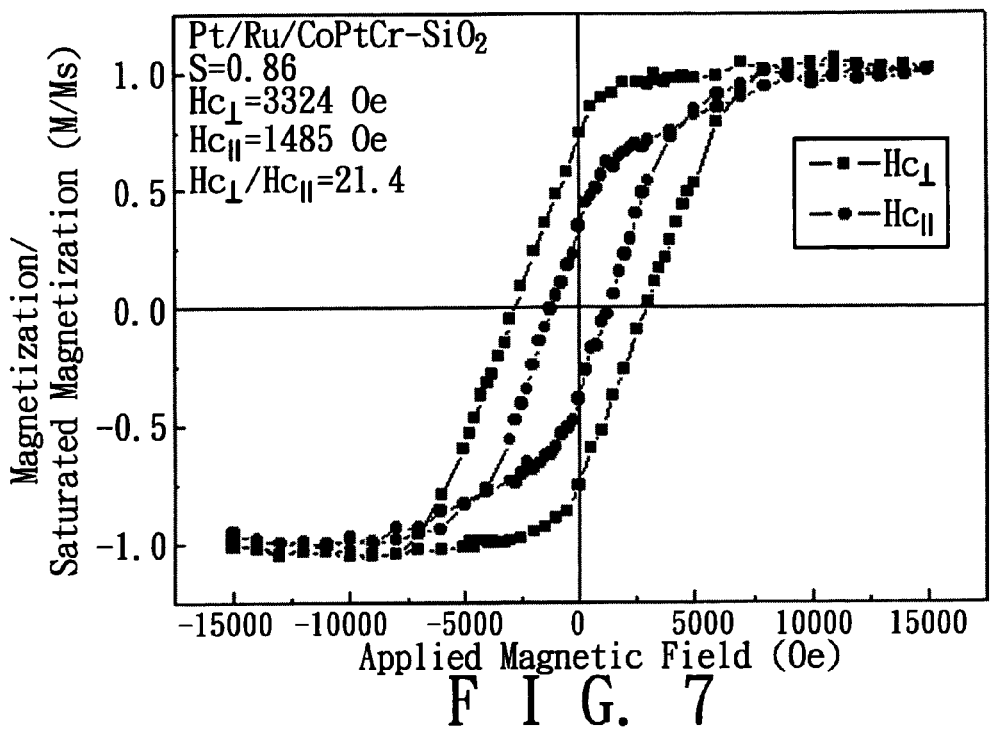
FIG. 7 shows a magnetic hysteresis loop illustrating magnetic property of the comparative example of the perpendicular magnetic recording medium.
Figure 8:
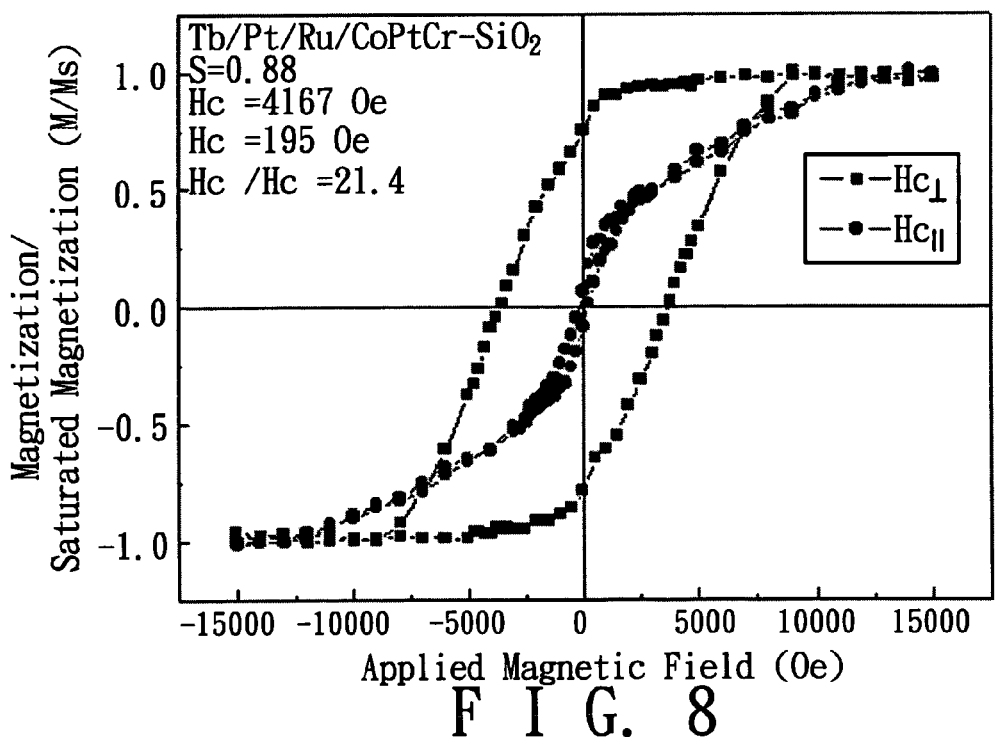
FIG. 8 shows a magnetic hysteresis loop illustrating magnetic property of the perpendicular magnetic recording medium shown in FIG. 2, in which the interlayer is made from Tb.

FIGS. 7 and 8 show magnetic hysteresis loops for the comparative example of the perpendicular magnetic recording medium and the preferred embodiment of the perpendicular magnetic recording medium of this invention. As shown in FIG. 7, perpendicular coercivity ($Hc_\perp$), in-plane coercivity ($Hc_\parallel$), and squareness (S value) of the comparative example are 3324 Oe, 1485 Oe, and 0.86, respectively. The value of $Hc_\perp/Hc_\parallel$ is 2.2. Referring to FIG. 8, perpendicular coercivity ($Hc_\perp$), in-plane coercivity ($Hc_\parallel$), and squareness (S value) of the preferred embodiment of this invention are 4167 Oe, 195 Oe, and 0.88, respectively. The value of $Hc_\perp/Hc_\parallel$ is 21.4. Therefore, the results show that the perpendicular magnetic recording medium of the preferred embodiment of this invention has a much higher ratio $Hc_\perp/Hc_\parallel$ than that of the comparative example, which indicates that the perpendicular magnetic recording medium of the preferred embodiment of this invention has a superior perpendicular anisotropy constant (Ku) over that of the comparative example. In addition, since squareness of the preferred embodiment of this invention is closer to 1, the perpendicular magnetic recording medium can achieve a larger output signal during recording.

According to the present invention, the perpendicular magnetic recording medium having the interlayer 43 made from the first metallic material selected from the group consisting of terbium, gadolinium, dysprosium, tantalum, hafnium, and combinations thereof exhibits an excellent grain orientation texture, good isolation among the grains, and enhanced perpendicular anisotropy constant (Ku).

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A perpendicular magnetic recording medium comprising:

a substrate;
   a soft magnetic film formed on said substrate;
   a non-magnetic film including an amorphous interlayer formed on said soft magnetic film and made from a first metallic material selected from the group consisting of terbium, gadolinium, dysprosium, hafnium, and combinations thereof, a buffer layer formed on said amorphous interlayer and having a face-centered cubic structure, and a seed layer formed on said buffer layer and having a hexagonal crystal structure; and
   a granular magnetic recording film formed on said seed layer.

2. The perpendicular magnetic recording medium of claim 1, wherein said amorphous interlayer is made from terbium.

3. The perpendicular magnetic recording medium of claim 2, wherein said amorphous interlayer has a thickness ranging from 2 nm to 12 nm.

4. The perpendicular magnetic recording medium of claim 1, wherein said seed layer is made from a second metallic material selected from the group consisting of ruthenium, titanium, rhenium, osmium, chromium, zinc, zirconium, technetium, magnesium, rhodium, tungsten, and combinations thereof.

5. The perpendicular magnetic recording medium of claim 4, wherein said seed layer has a thickness ranging from 5 nm to 40 nm.

6. The perpendicular magnetic recording medium of claim 1, wherein said buffer layer is made from a third metallic material selected from the group consisting of platinum, palladium, copper, gold, silver, and combinations thereof.

7. The perpendicular magnetic recording medium of claim 1, wherein said granular magnetic recording film is made from a cobalt-based material.

8. The perpendicular magnetic recording medium of claim 1, wherein said soft magnetic film is made from an alloy selected from the group consisting of cobalt-zirconium-tantalum, cobalt-zirconium-niobium, cobalt-iron, cobalt-iron-nitrogen, cobalt-iron-boron, iron-tantalum-carbon, iron-aluminum-silicon, nickel-iron, and nickel-phosphorus.

* * * * *